United States Patent
Zeiler et al.

(10) Patent No.: US 11,243,998 B2
(45) Date of Patent: Feb. 8, 2022

(54) USER INTERFACE FOR CONTEXT LABELING OF MULTIMEDIA ITEMS

(71) Applicant: Clarifai, Inc., New York, NY (US)

(72) Inventors: Matthew D. Zeiler, New York, NY (US); Adam L. Berenzweig, New York, NY (US)

(73) Assignee: CLARIFAI, INC., New York, NY (US)

( * ) Notice: Subject to any disclaimer, the term of this patent is extended or adjusted under 35 U.S.C. 154(b) by 0 days.

(21) Appl. No.: 17/176,413

(22) Filed: Feb. 16, 2021

(65) Prior Publication Data

US 2021/0165817 A1 Jun. 3, 2021

Related U.S. Application Data

(63) Continuation of application No. 16/251,317, filed on Jan. 18, 2019, now Pat. No. 10,921,957, which is a
(Continued)

(51) Int. Cl.

| | |
|---|---|
| *G06F 3/0484* | (2013.01) |
| *G06F 16/44* | (2019.01) |
| *G06F 7/08* | (2006.01) |
| *G06N 20/00* | (2019.01) |
| *G06F 16/48* | (2019.01) |
| *G06N 3/08* | (2006.01) |
| *G06N 3/04* | (2006.01) |
| *G06N 5/02* | (2006.01) |
| *G06F 40/30* | (2020.01) |
| *G06F 40/35* | (2020.01) |

(Continued)

(52) U.S. Cl.
CPC ............ *G06F 16/44* (2019.01); *G06F 3/0482* (2013.01); *G06F 3/04842* (2013.01); *G06F 7/08* (2013.01); *G06F 16/48* (2019.01); *G06F 40/166* (2020.01); *G06F 40/30* (2020.01); *G06F 40/35* (2020.01); *G06N 3/0427* (2013.01); *G06N 3/0454* (2013.01); *G06N 3/08* (2013.01); *G06N 5/022* (2013.01); *G06N 5/04* (2013.01); *G06N 20/00* (2019.01)

(58) Field of Classification Search
None
See application file for complete search history.

(56) References Cited

U.S. PATENT DOCUMENTS

7,831,913 B2    11/2010  MacLaurin
9,614,894 B1 *   4/2017  Tripathy ................. G06F 16/48
(Continued)

*Primary Examiner* — Thanh T Vu
(74) *Attorney, Agent, or Firm* — Buckley, Maschoff & Talwalkar LLC (57) ABSTRACT

In certain embodiments, a neural network may be trained to associated context information with multimedia items. In some embodiments, context predictions for multimedia items may be obtained via a neural network. A first multimedia item and a first task related to a first context prediction for the first multimedia item may be presented on a user interface. A user response to the first task may be obtained via the user interface. Based on the user response to the first task, prediction feedback related to the first context prediction or the first multimedia item may be provided to the neural network to cause the neural network to be updated based on the prediction feedback.

20 Claims, 6 Drawing Sheets

Related U.S. Application Data continuation of application No. 15/002,248, filed on Jan. 20, 2016, now Pat. No. 10,222,942.

(60) Provisional application No. 62/106,648, filed on Jan. 22, 2015.

(51) Int. Cl.
*G06F 40/166* (2020.01)
*G06F 3/0482* (2013.01)
*G06N 5/04* (2006.01)

(56) References Cited

U.S. PATENT DOCUMENTS

| | | | |
|---|---|---|---|
| 2011/0145327 A1* | 6/2011 | Stewart | G06F 16/58 709/203 |
| 2012/0054658 A1* | 3/2012 | Chuat | G06F 16/583 715/771 |
| 2012/0072845 A1* | 3/2012 | John | G06F 16/48 715/738 |
| 2013/0151339 A1* | 6/2013 | Kim | G06Q 30/02 705/14.55 |
| 2014/0040828 A1 | 2/2014 | Choi et al. | |
| 2015/0019579 A1* | 1/2015 | Won | G06F 16/48 707/758 |

\* cited by examiner

USER INTERFACE FOR CONTEXT LABELING OF MULTIMEDIA ITEMS

CROSS-REFERENCE TO RELATED APPLICATIONS

This application is a continuation of U.S. patent application Ser. No. 16/251,317, filed Jan. 18, 2019, which is a continuation of U.S. patent application Ser. No. 15/002,248, filed Jan. 20, 2016, which claims the priority benefit of U.S. Provisional Patent Application No. 62/106,648, filed Jan. 22, 2015, each of which is incorporated herein by reference.

FIELD OF THE DISCLOSURE

The present disclosure relates generally to organizing a plurality of multimedia items stored in a repository of multimedia items using automatically generated labels.

BACKGROUND

Association of context information with multimedia items may allow for an efficient organization of the multimedia items. By way of non-limiting example, users may be able search for multimedia items stored in a repository of multimedia items based on the context information associated therewith. Context information may be stored as metadata associated with the multimedia items.

SUMMARY

One or more aspects of the disclosure relate to a system for associating context information with individual ones of multimedia items stored in a repository of one or more multimedia items. A given multimedia item may include one or more of an image, a video, audio, a text file, combinations thereof, and/or other considerations. The context information associated with individual ones of the multimedia items may be referred to as "labels," "tags," and/or other terms. An association of context information to individual ones of the multimedia items may be referred to as "labeling," "tagging," and/or other terms. Labels and/or other information associated with a multimedia item may be stored as metadata associated with the multimedia item. In some implementations, a label and/or other metadata may include one or more of a category, a geolocation, a timestamp, a price, semantic description, content description, a rating, and/or other information associated with a given multimedia item that may provide context for a multimedia item.

In some implementations, one or more components of the system may be configured such that labels and/or other information associated with a multimedia item may be initially and/or automatically associated with the multimedia item based on a preprocessing of the multimedia items. The initially associated labels may be predictions of labels that may be associated with the multimedia item. The preprocessing may include one or more of automatically clustering the multimedia items into groups (e.g., grouping one or more multimedia items together based on similarity between the labels of the multimedia items and/or semantic similarity), and/or other operations. In some implementations, a preprocessing of the multimedia items may facilitate a technique for organizing the multimedia items for presentation to one or more users in one or more user interfaces. In some implementations, a user may be presented with a set of multimedia items based on the automatic clustering of the multimedia items achieved in a preprocessing step. A user may carry out one or more labeling tasks for adding a label, removing a label, changing a predicted label, confirming a predicted label, and/or providing other input. In some implementations, a user may add, remove, change, and/or confirm the predicted labels of the set of multimedia content all at once, rather than for individual ones of the multimedia items one at a time.

By way of non-limiting example, types of labeling tasks determined to be carried out by one or more users may correspond to one or more of: labeling items with a fixed vocabulary; labeling items with an open-ended vocabulary; labeling items with one label per item; labeling items with multi labels per item; labeling regions, ranges, and/or parts of an item (e.g., bounding boxes of an image, time ranges of video or audio, and/or other considerations); labeling relationships between individual items (e.g., within individual groupings); labeling relationships between groups of items; ranking items by quality, preference, relevance, and/or other information; and/or other tasks.

In some implementations, one or more aspects of the disclosure presented herein may improve an efficiency by which one or more users add, remove, change, confirm, and/or provide other input related to one or more label predictions. Thus the predicted labels and/or other metadata may provide an initial organization of the multimedia items for presentation to the user on a user interface. One or more aspects of organization facilitated herein may leverage principles of cognitive and/or perceptual psychology.

In some implementations, one or more aspects of the disclosure may utilize principles derived from methodologies of human cognition and perception to increase labeler efficiency in several ways. By way of non-limiting example, one or more aspects of the disclosure may achieve improved labeling efficiency by: reducing cognitive load by minimizing context switches; labeling many images with one label before changing an association of the labels; grouping similar multimedia items together to form repeating patterns; sorting objects by confidence of the prediction so that the user can quickly skip over regions of high homogeneity/consistency, since it may be easier to detect overall trends over groups of items rather than individual items; offering binary decisions where possible, rather than asking a user to choose from multiple options; asking a user to make decisions based on a set of images together, rather than one image at a time; asking questions whose answers are immediately obvious from the provided data, rather than involving additional context or thought; as well as other advantages that may become apparent to one skilled in the art upon a full reading of this disclosure. The system may facilitate labeling decisions that are fast, objective, and/or accurate representations of the associated multimedia items. By way of non-limiting example, human perceptual systems may be well optimized for spotting differences/disruptions in repeating patterns, rather than looking for particular objects in an array of visually heterogeneous images.

In some implementations, one or more aspects of the disclosure may be used to generate examples of correct (e.g., up to some threshold confidence score) associations of context information with multimedia items to train a machine learning system that may be configured to label multimedia items automatically. By way of non-limiting example, providing a set or sets of multimedia items having metadata associated therewith with a high degree of confidence may provide a technique to "bootstrap" from a machine learning prediction model to subsequent iterations of the machine learning prediction model having increasing accuracy. The initial machine learning prediction model may be associated with a high degree of association errors but may be accurate enough to be used with one or more implementations where a user may subsequently add, remove, change, and/or confirm the initial (e.g., predicted) labeling and/or provide other input. Subsequent iterations of the machine learning prediction model may be trained on increasingly "clean" training data (e.g., based on user additions, removal, changes, and/or confirmations of predictions and/or other input), which generally produces better-performing machine learning models and may subsequently increase labeling efficiency.

In some implementations, one or more aspects of the disclosure may be used to generate labels to be indexed by a search engine for searching a large repository of multimedia items.

In some implementations, one or more aspects of the disclosure may be used to moderate and/or filter multimedia content to remove/confirm items that don't match a set of labels or other criteria. This may include removing off-topic, offensive, and/or low-quality multimedia data, and/or other considerations.

In some implementations, the system may comprise one or more hardware processors configured to execute one or more computer program components. The computer program components may include a preprocessing component, a task component, a user interface (UI) component, a learning component, and/or other components. In some implementations, the computer program components may be housed in the same or different physical processor(s).

In some implementations, the preprocessing component may be configured to obtain one or more multimedia items from a repository of one or more multimedia items. Individual ones of the multimedia items may include one or more of an image, a video, audio, or a text file, and/or other considerations. The preprocessing component may be configured to predict context information to be associated with individual ones of the multimedia items. In some implementations, the prediction may be based on a machine learning prediction model, and/or other information. The preprocessing component may be configured to determine confidence scores for individual ones of the predicted labels. A confidence score may correspond to a degree of certainty (or uncertainty) that the predicted labels accurately represent the associated multimedia item and/or other considerations.

In some implementations, the preprocessing component may be configured to determine semantic representations for one or more multimedia items. By way of non-limiting example, a given semantic representation may be determined based on properties of the multimedia item, provided metadata and/or predicted metadata, and/or other information. In some implementations, the semantic representation may be used to determine semantic similarity between multimedia items. By way of non-limiting example, the semantic representation may comprise a discrete scalar value, a multi-dimensional quantity, a vector, a signal, a graphic representation, a text description, and/or other considerations. In some implementations, a semantic similarity score may be computed and/or determined from the semantic representations. In some implementations, pairwise similarity scores may be computed directly between pairs of multimedia items. Briefly, semantic representations and/or similarity scores may be used to cluster multimedia items into groups based on semantic similarity and/or to retrieve semantically similar items from a database.

In some implementations, the task component may be configured to generate one or more tasks and/or sets of tasks to be performed by one or more users via user interfaces. Tasks may correspond to presenting users options for adding, removing, changing, and/or confirming predicted labels associations within a user interface, and/or providing other input. The task component may be configured to select one or more labels or sets of labels from the labels predicted by the preprocessing component to correspond with individual ones of the tasks. By way of non-limiting example, a first label and/or a first set of labels from the labels predicted by the preprocessing component may be selected for a first task. In some implementations, the selection may be based on the confidence scores and/or other information. In some implementations, confidence scores may be used to prioritize the labels into a sequence of tasks that may be presented to a user (e.g., tasks associated with labels having low confidence scores may be prioritized over tasks associated with labels having high confidence scores, and/or other considerations).

In some implementations, the task component may be configured to select one or more multimedia items having predicted labels that match the labels selected by the task component. The task component may be configured to sort the selected multimedia items into a list based on one or more sorting metrics. A sorting metric may be based on one or more of time (e.g., most recent), priority, predicted confidence score, similarity to an exemplar, and/or other information.

In some implementations, the task component may be configured to associate multimedia items into item groups based on the semantic representations (e.g., determined similarity scores, and/or other information). The groups may be associated with group tasks that correspond to sets of homogeneous multimedia items that may reduce cognitive load on the user who subsequently adds, removes, changes, and/or confirms the predicted labels and/or provides other input related to the group.

The task component may be configured to associate individual multimedia items and/or item groups with individual tasks to be presented to one or more users via respective user interfaces. At some point in time, the task component may be configured to determine if consensus has been reached among users for labels associated with individual ones of the multimedia items and/or individual ones of the item groups. Once consensus has been determined, the tasks component may be configured to remove the associated tasks from the set of tasks to be completed by the one or more users.

The user interface component may be configured to effectuate presentation of a user interface to one or more users via user devices associated with the users. The user interface may be configured to display one or more of the obtained multimedia items, predicted context information associated with the one or more obtained multimedia items, and/or other information corresponding to one or more tasks and/or sets of tasks determined by the task component. The user interface component may be configured to obtain entry and/or selection of input from users via the user interface. The input may correspond to one or more of adding, removing, changing, and/or confirming a predicted label for an individual multimedia item and/or group of semantically similar multimedia items, and/or other input. In some implementations, the preprocessing component may be configured to update the predicted labels based on the user input.

The learning component may be configured to generate a new machine learning prediction model and/or update an existing machine learning prediction model based on the user input.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a", "an", and "the" include plural referents unless the context clearly dictates otherwise.

DETAILED DESCRIPTION

Figure 1:
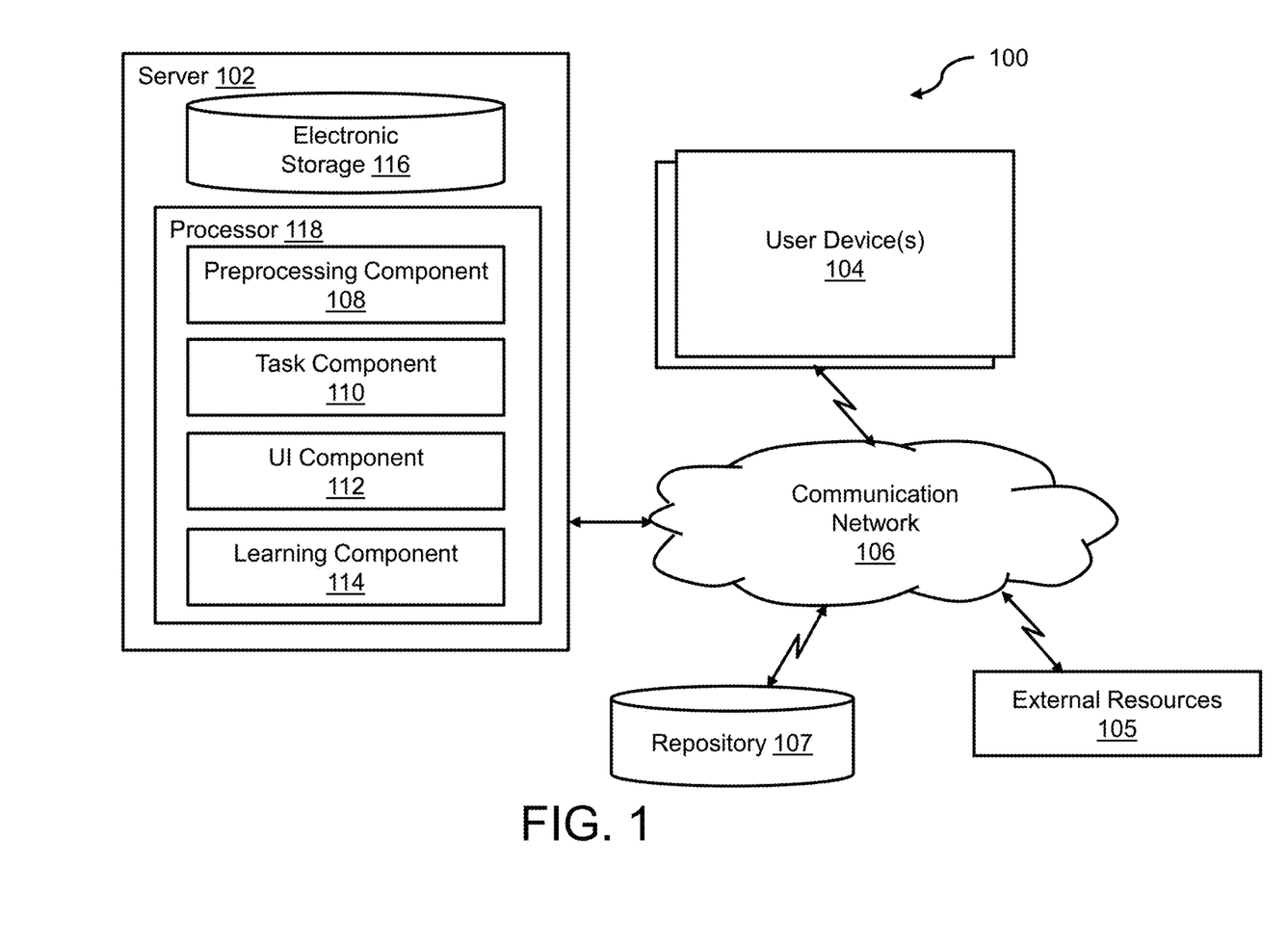
FIG. 1 illustrates a system for associating context information with multimedia items, in accordance with one or more implementations.

FIG. 1 illustrates a system 100 for associating context information with one or more multimedia items, in accordance with one or more implementations. In some implementations, the multimedia items may be obtained from a repository 107 of multimedia items, and/or from other locations. A given multimedia item may include one or more of an image, video, audio, a text file, combinations thereof, and/or other considerations. The context information associated with individual ones of the multimedia items may be referred to as "labels," "tags," and/or other terms. In some implementations, a label may generally refer to any information associated with a multimedia item. By way of non-limiting example, labels may include one or more of a category, a geolocation, a timestamp, pricing information, ratings, a semantic description, a content description, and/or other considerations. An association of context information to individual ones of the multimedia items may be referred to as "labeling," "tagging," and/or other terms. Labels and/or other information associated with a multimedia item may be stored as metadata associated with the multimedia item.

In some implementations, the association may be based on i) predicting associations of context information with individual ones of the multimedia items, ii) verifying the predictions by presenting the multimedia items and/or predictions to one or more users via one or more user interfaces, and/or other operations. In some implementations, label prediction (or interchangeably called tag prediction, metadata prediction, and/or classification) may comprise using machine learning algorithms, object recognition, and/or other techniques to determine labels directly from the content of the multimedia items. In some implementations, verification may be comprised of one or more labeling tasks 221 carried out by one or more users. The verification provided by users may be used to update a machine learning algorithm and/or generate new machine learning algorithms and/or other technique(s) used for label prediction.

In some implementations, labeling tasks 221 may include one or more units of work for one or more users. A given task may be completed by a user with a set of actions. By way of non-limiting example, this may include providing entry and/or selection of elements displayed on a user interface to add a label, remove a predicted label, change a predicted label, confirm a predicted label, and/or other input. The input may be recorded as a labeling response.

In some implementations, user interfaces may be hosted over a communication network 106, such as the Internet. The user interface may be hosted by a server 102 to user devices 104 associated with users of the system 100. The server 102 may comprise one or more hardware processors 118 configured to execute one or more computer program components. The computer program components may include a preprocessing component 108, a task component 110, a user interface (UI) component 112, a learning component 114, and/or other components. Users may access the system 100 and/or user interface (not shown in FIG. 1) via user devices 104. User devices 104 may include, for example, a cellular telephone, a smartphone, a laptop, a tablet computer, a desktop computer, a television set-top box, smart TV, a gaming console, and/or other device as described herein and/or other considerations.

It is noted that in some implementations, some or all of the functionality of server 102 may be attributed to one or more user devices 104. In some implementations, the user devices 104 may include one or more hardware processors (not shown) configured to execute computer program components the same or similar to components 108-114. For example, the user devices 104 may be configured to host the user interface (not shown in FIG. 1) locally based on information stored locally on the user devices 104. This implementation may be an "offline" implementation of the system 100, and/or other considerations. When user devices 104 run offline, one or more components executed by processors of the user devices 104 may gather information from tasks 221 carried out by the user and communicate information to the server 102 when an "online" connection may be made, and/or other considerations.

Figure 2:
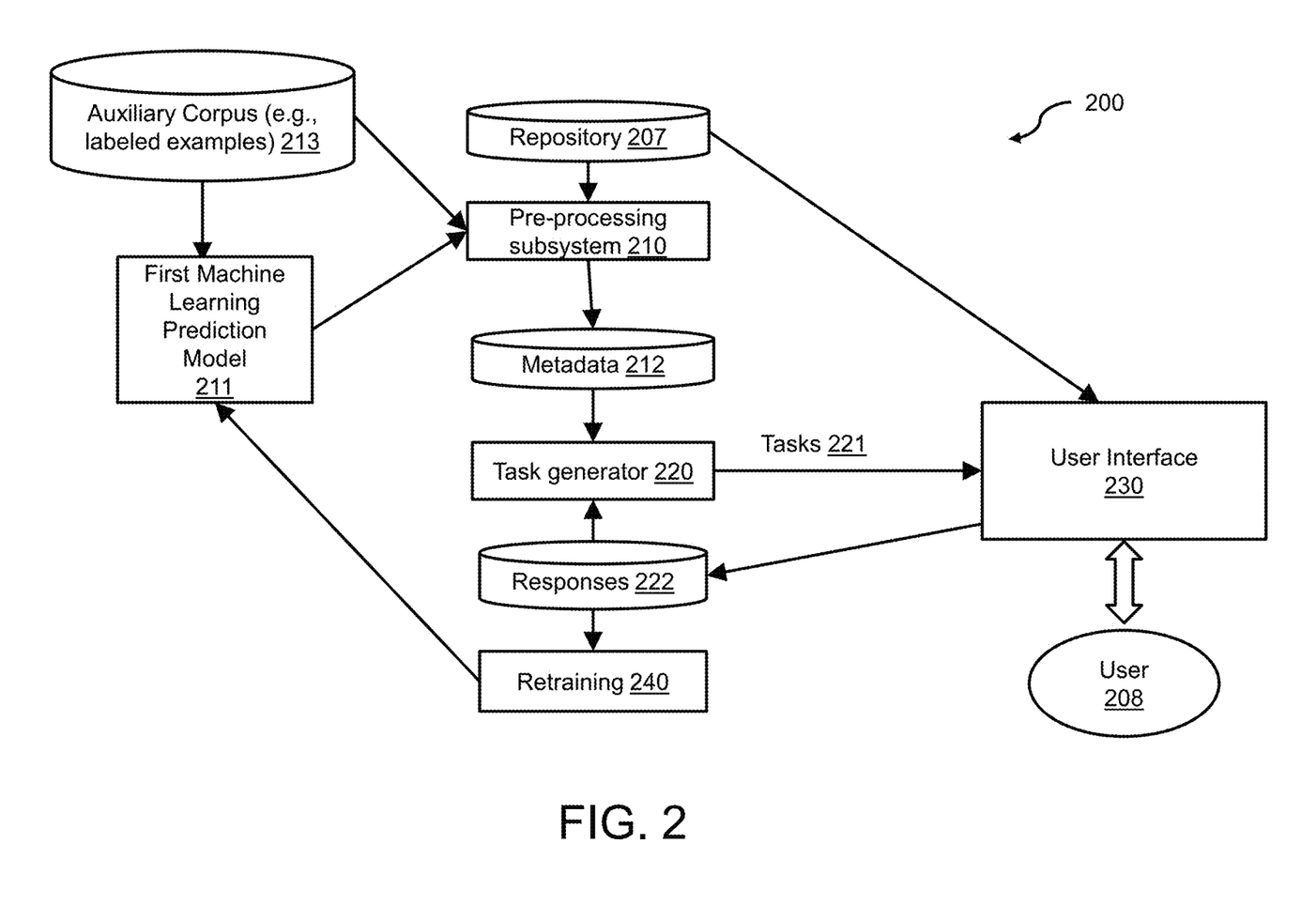
FIG. 2 illustrates a diagram of information flow of a system for associating context information with multimedia items, in accordance with one or more implementations.

FIG. 2 illustrates a diagram of information flow of a system 200 for associating context information with multimedia items, in accordance with one or more implementations. System 200 may be the same or similar to system 100 in FIG. 1. In some implementations, a preprocessing subsystem 210 (e.g., facilitated by preprocessing component 108 in FIG. 1) may produce context information and/or other information associated with one or more multimedia items obtained from a repository 207. The preprocessing subsystem 210 may facilitate organization of subsequent labeling tasks 221 to be carried out by one or more users, wherein the tasks 221 correspond to the associations of metadata to individual ones of the multimedia items and/or groups of multimedia. The preprocessing subsystem 210 may be configured to use a first machine learning prediction model 211 to generate initial predictions of labels for individual ones of the multimedia items, an auxiliary training corpus 213 used to (at least initially) train the first machine learning prediction model 211, and/or other models and/or information. By way of non-limiting example, the auxiliary training corpus 213 may include one or more multimedia items being associated with one or more labels, wherein the associations are based on a high degree of confidence and/or an exact match (e.g., facilitated by manual user input). Information produced from the preprocessing subsystem 210 may be stored in a content metadata store 212 and/or otherwise communicated directly to a task generator subsystem 220.

The auxiliary training corpus 213 of labeled examples may be used in several ways. By way of non-limiting example, the auxiliary training corpus 213 may be used to: train the first machine learning prediction model 211; to "amplify" the labels in the auxiliary corpus 213; and/or other considerations. In some implementations, the labels in the auxiliary corpus may be amplified by propagating the training labels of the auxiliary corpus to similar items from the repository 207, as determined by semantic representations (see, e.g., semantic similarity component 320 in FIG. 3). By way of non-limiting example, for amplifying a given label X, one or more components of the system 200 may be configured to detect outliers in the repository 207 by finding items in the repository 207 that are labeled with X but are not similar to any item labeled X in the auxiliary corpus 213, as determined by semantic representations 321 and/or other information.

In some implementations, labels and/or other information may be associated with segments or portions of multimedia items. By way of non-limiting example, labels may be associated with spatial regions defined by bounding boxes or polygons, time segments associated with start and end ranges, and/or other considerations. Such labels may be computed from the first machine learning prediction model 211 in several ways. By way of non-limiting example, operations such as running the prediction model 211 over multiple crops, locations, portions, and/or segments of a given multimedia item; sorting the crops, locations, portions, and/or segments of the multimedia item by prediction confidence; and/or other considerations. In some implementations where the first machine learning prediction model 211 may be configured to produce localization metadata (including bounding boxes, time segmentations, and/or other considerations), initial crops or segments may be generated using the model directly.

In some implementations, the task generator subsystem 220 (e.g., executed by task component 110 in FIG. 1) may be configured to generate tasks 221 to present to one or more users (e.g., user 208) via user interfaces (e.g., user interface 230). The tasks 221 may be determined based on the initial predictions and/or other information.

By way of non-limiting example, user interface 230 may be configured (e.g., via user interface component 112 in FIG. 1) to present labeling tasks 221 to the user 208, receive responses 222 corresponding to user input, communicate responses 222 back to the task generator subsystem 220 for use when generating and/or removing, and/or other considerations.

In some implementations, responses 222 may facilitate a retraining process 240. The retraining process 240 may be configured to use responses 222 recorded during the labeling tasks 221 to generate a second machine learning prediction model and/or update the first machine learning prediction model 211. In some implementations, the processes described herein with reference to FIG. 2 may be iterated over one or more tasks 221 for one or more different labels and/or multimedia items to generate prediction models having a relatively higher degree of accuracy over time and/or to continually update an initial prediction model.

Returning to FIG. 1, the preprocessing component 108 may be configured to obtain one or more multimedia items from a repository 107 of one or more multimedia items. Individual ones of the multimedia items may include one or more of an image, a video, audio, a text file, and/or other considerations. The preprocessing component 108 may be configured to predict context information associated with individual ones of the multimedia items. In some implementations, predictions may be based on a machine learning prediction model, and/or other information. The preprocessing component 108 may be configured to determine confidence scores for individual ones of the predicted labels. A confidence score may correspond to a degree of certainty (or uncertainty) that the predicted labels accurately represent the associated multimedia item, and/or other considerations. A confidence score may be numerical (e.g., points, amount, score, rank, ratings, grades, or any other type of numerical value), descriptive (e.g., text for a confidence level, and/or other considerations), progressive (e.g., high confidence match, medium confidence match, low confidence match, and/or other considerations), pictorial (e.g., an image representing a confident facial expression, an image representing an unconfident facial expression, and/or other considerations), and/or any other type of value for a confidence score.

In some implementations, the preprocessing component 108 may be configured to determine semantic representations 321 for multimedia items. By way of non-limiting example, a given semantic representation may be determined based on properties of a multimedia item, provided metadata and/or predicted metadata, and/or other information. In some implementations, the semantic representation may be used to determine semantic similarity between multimedia items. By way of non-limiting example, the semantic representation may comprise a discrete scalar value, a multi-dimensional quantity, a vector, a signal, a graphic representation, a text description, and/or other considerations. In some implementations, a semantic similarity score may be computed and/or determined from the semantic representations 321. In some implementations, pairwise similarity scores may be computed directly between pairs of multimedia items. Briefly, semantic representations 321 and/or similarity scores may be used to cluster multimedia items into groups based on semantic similarity and/or to retrieve semantically similar items from repository 107.

In some implementations, a semantic similarity score may be numerical (e.g., points, amount, score, rank, ratings, grades, or any other type of numerical value), descriptive (e.g., text of a semantic description and/or other considerations), progressive (e.g., high semantic match, medium semantic match, low semantic, and/or other considerations), pictorial (e.g., an image and/or other considerations), and/or any other type of value for a semantic similarity score.

Semantic representations 321 may facilitate grouping two or more multimedia items together such that semantically and/or perceptually similar multimedia items may be grouped together based on a degree of similarity, and/or other considerations. Techniques from the fields of machine learning and/or data analysis may be used to automate the process of grouping similar items together (e.g., clustering). In some implementations, grouping may involve visually grouping multimedia items and/or representations of multimedia items by a visual distance (e.g., a smaller distance representing a closer semantic match), similarity in a metric space such as a visual-semantic embedding space, similarity in predicted tag or text embedding space, a matrix or "kernel" of pairwise similarity scores generated from a machine learning algorithm trained to predict pairwise item similarity, and/or other considerations. By way of non-limiting example, multimedia items including images of dogs may be grouped with multimedia items including images of other dogs; multimedia items including images of dogs of the same breed may be associated with another group; a multimedia item including an image of a dog may be grouped closer with a multimedia item including an image of a cat than with a multimedia item including an image of a car; and/or other considerations.

Figure 3:
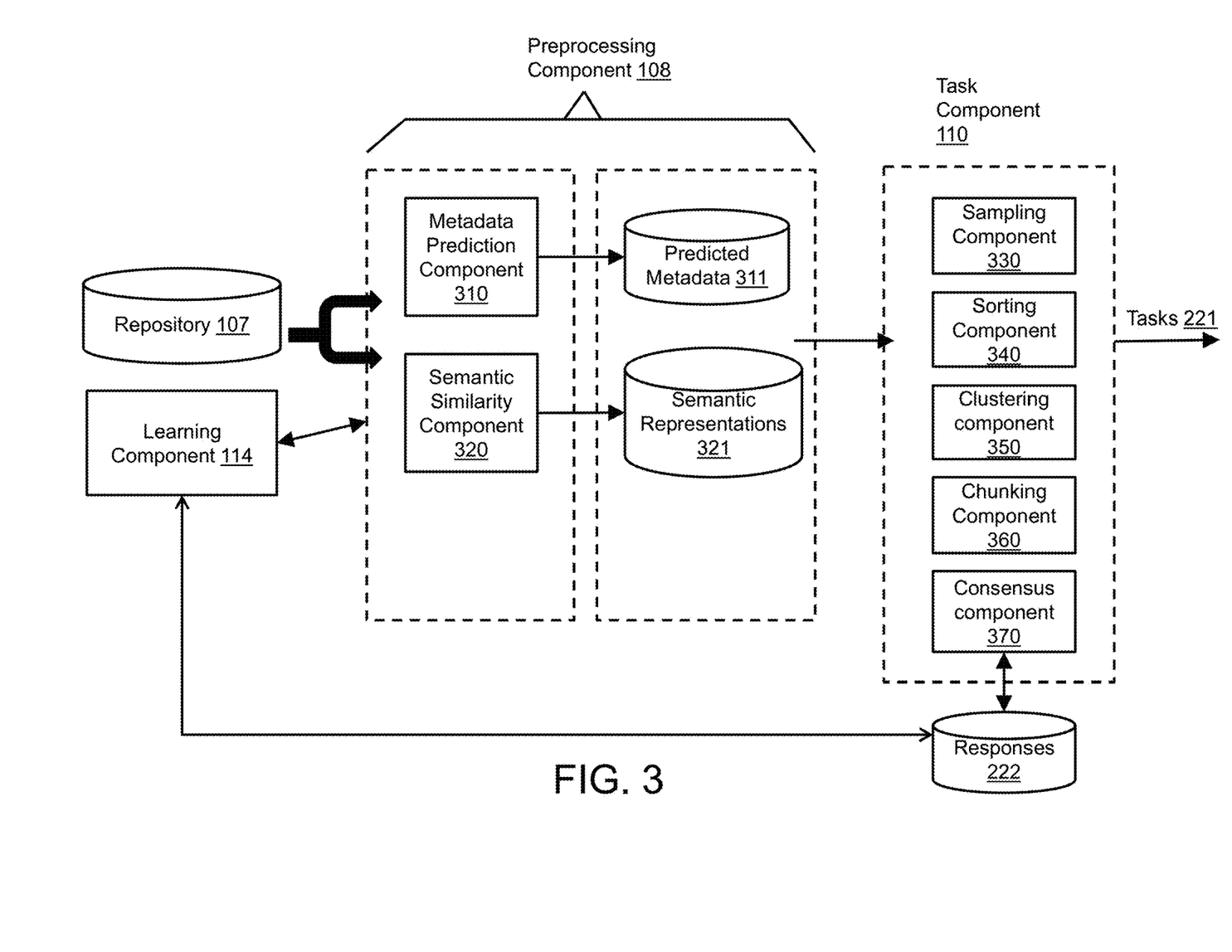
FIG. 3 illustrates a diagram of information flow in accordance with preprocessing and/or task generation operations of a system for associating context information with multimedia items, in accordance with one or more implementations.

As an illustrative example in FIG. 3, in some implementations, the preprocessing component 108 may include one or more of a metadata prediction component 310, a semantic similarity component 320, and/or other components. The metadata prediction component 310 may be configured to generate predicted metadata 311 and/or other information associated with one or more multimedia items. The predicted metadata 311 may include label predictions, prediction confidence scores, and/or other information. By way of non-limiting example, the metadata prediction component 310 may be configured to execute object recognition software communicating with a machine learning algorithm (e.g., managed by the learning component 114) to extract information from one or both of images and/or video to determine one or more labels to associate with the images and/or video, and/or other considerations. A machine learning algorithm (e.g., managed by the learning component 114) may include one or more of a convolutional neural network, a machine learning prediction model (e.g., first machine learning prediction model 211 in FIG. 2), and/or other information. Another implementation may employ manual tagging of metadata by users to bootstrap this step. By way of non-limiting example, object recognition software may recognize, within a multimedia item including an image, a person holding a baseball bat in a stance ready to swing. The metadata prediction component 310 may be configured to associate a label such as "baseball" with the multimedia item as a predicted label.

In some implementations, the semantic similarity component 320 may be configured to determine semantic representations 321 used for grouping multimedia items by similarity. By way of non-limiting example, multimedia items may be embedded into a semantic similarity space based on properties of the multimedia items, provided metadata and/or predicted metadata 311, and/or other information. In some implementations, pairwise similarity may be computed directly between pairs of multimedia items in the repository 107. Semantic representations 321 may be determined and/or used in other ways.

By way of non-limiting example, the preprocessing component 108 may be configured to obtain a first multimedia item and/or other multimedia items from the repository 107. The preprocessing component 108 may be configured to associate predicted first context information (e.g., a first label) with the first multimedia item. The preprocessing component 108 may be configured to associate predicted second context information (e.g., a second label) with the first multimedia item. The preprocessing component 108 may be configured to determine a first confidence score regarding the association of the first context information with the first multimedia item. The preprocessing component 108 may be configured to determine a first semantic representation associated with the first multimedia item. The first semantic representation may be used to determine a semantic similarity between the first multimedia item and at least one other multimedia item. The preprocessing component 108 may be configured to predict other information to associate with the first multimedia item.

Returning to FIG. 1, the task component 110 may be configured to generate one or more tasks 221 and/or sets of tasks 221 to be performed by one or more users via user interfaces. Tasks 221 may correspond to presenting users options for adding context information (e.g., labels) to the metadata of a multimedia item, removing predicted context information from metadata, changing the predicted context information, confirming predicted context information associations, and/or providing other input, facilitated by a user interface. The task component 110 may be configured to select one or more labels or sets of labels from the labels predicted by the preprocessing component 108 to correspond with individual ones of the tasks 221.

As an illustrative example in FIG. 3, the task component 110 may include one or more of a sampling component 330, a sorting component 340, a clustering component 350, a chunking component 360, a consensus component 370, and/or other components. The sampling component 330 may be configured to select certain metadata and/or portions of metadata (e.g., a label, a group of labels, and/or other considerations) from the set of predicted metadata 311 to be associated with one or more tasks 221. The selection may be based on one or more of the predicted labels, confidence scores, semantic representations 321, semantic similarity scores, and/or other information. In some implementations, selection may be based on prioritizing tasks 221. By way of non-limiting example, metadata that was associated with one or more multimedia items with relatively low confidence may be included in tasks 221 that are prioritized over tasks 221 corresponding to metadata that was associated with one or more multimedia items with a higher degree of confidence, and/or other considerations.

In some implementations, the sampling component 330 may be configured to determine one or more multimedia items and/or crops/segments of one or more of the multimedia items whose predicted metadata 311 match the selected first portion of metadata.

In some implementations, the sorting component 340 may be configured to sorting multimedia items into a list based on one or more sorting metrics. A sorting metric may be based on one or more of a time parameter (e.g., newest to oldest, and/or other considerations), priority (e.g., multimedia items associated with high priority tasks may be higher in the list than multimedia item associated with low priority tasks, and/or other considerations), predicted confidence (e.g., sorting from relatively low confidence score to relatively high confidence scores), and/or other considerations.

In some implementations, the clustering component 350 may be configured to associate multimedia items with groups based on the semantic representations 321. The groups may be associated with group tasks 221 that may reduce cognitive load for the user.

In some implementations, the chunking component 360 may be configured to associate one or more multimedia items and/or item groups in the list with individual tasks 221 to be presented to one or more users via respective user interfaces. The individual tasks 221 may be organized into a sequence of tasks.

In some implementations, after some time of user interaction with a user interface (e.g., described with reference to user interface component 112 herein), the consensus component 370 may be configured to determine if consensus has been reached among the responses 222 of the users for individual ones of the multimedia items and/or individual ones of the item groups associated with given tasks 221. Responsive to a consensus being reached, the task component 110 may be configured to remove the task(s) 221 corresponding to the multimedia item and/or item group from the sequence of tasks. Responsive to consensus not being reached, the task(s) 221 corresponding to the multimedia item and/or item group may be maintained in the sequence of tasks until consensus is reached. In some implementations, consensus may be based a threshold number of users agreeing on the same or substantially the same metadata associations.

By way of non-limiting example, when multiple users are available, the task component 110 (e.g., the consensus component 370) may incorporate a consensus algorithm to determine when a particular task may be complete. In some implementations, the same task may be sent to multiple users, the responses 222 from each compared, and/or the algorithm may be used to determined that the task has sufficient consensus (agreement between users) and may be complete. In some implementations the task component 110 may be configured to determine that consensus has not been reached and/or to send the task to one or more other users. These consensus determinations may also be used to prioritize tasks 221 that may be confusing to one or more users. By way of non-limiting example, the first context information may be associated with a first task. The first task may be presented to the first user, a second user, and/or other users. The first task may correspond to a presentation of the first content information, the first multimedia item, and/or other elements presented on a user interface. Responsive to determining a consensus between the first user and the second user regarding the association of the first context information with the first multimedia item, the first task may no longer be presented to the first user, second user, and/or other users.

Returning to FIG. 1, the user interface component 112 may be configured to effectuate presentation of user interfaces. The user interfaces may be configured to display one or more of the obtained multimedia items, the predicted context information associated with the one or more obtained multimedia items, and/or other display elements. By way of non-limiting example, a first user interface may be configured to display the first multimedia item, the predicted first context information associated with the first multimedia item, and/or other information.

In some implementations, the user interface component 112 may be configured to effectuate display of user interfaces, including elements such as an array of rendered multimedia items and/or representations of the multimedia items (e.g., a rendered image and/or a representation of the image such as a written description, and/or other considerations), interaction elements facilitating user entry and/or selection of addition, removal, change, and/or confirmation of a predicted label for generating labeling responses, and/or other elements facilitating user input.

In some implementations, a rendered multimedia item may comprise one or more of a visual summary (e.g., an image thumbnail, video storyboard, text data, audio signals, filename, and/or other properties visually denoting the multimedia item), displayed metadata (e.g., labels, confidence scores, semantic representations, semantic similarity scores, and/or other information), and/or other information. In some implementations, interaction elements for generating labeling responses may comprise one or more of an element for multimedia item selection (e.g., binary filtering), an element for threshold selection, an element for bounding box selection and/or adjustment, an element for continuous value refinement, an element for multiple choice (e.g., if the user is presented with a list of options, and/or other considerations), and/or other interaction elements.

In some implementations, the user interacts with a user interface and interaction elements to generate labeling responses. Interaction for different kinds of labeling tasks 221 may include binary labeling tasks, threshold selection, flipping the default, bounding box selection, ranking tasks, dynamic sorting, and/or other tasks.

Binary labeling tasks may correspond to user selection (or deselection) of individual multimedia items and/or other interface elements that the user judges to be relevant or not relevant to the label or other metadata associated with a task.

Threshold selection may correspond to user selection and/or position adjustment of a position of a marker that indicates the separation between items that may be relevant and/or those that may not be relevant to the label associated with the task.

Flipping the default may correspond to a threshold selection task that may be combined with binary labeling. By way of non-limiting example, a default for unlabeled items may update dynamically, as a function of a current threshold setting. Items above the threshold may default to positive examples, and those below may default to negative examples. Unlabeled items may be labeled with a corresponding default accordingly. When the user selects and/or adjusts a threshold, items may be updated accordingly.

Bounding box may correspond to a polygon and/or other complex multimedia item content refinement and/or adjustment. By way of non-limiting example, a bounding box may be a drawing superimposed over an image that may indicate a predicted dimension and/or position of contents relevant to the label associated with the task. Contents may correspond to one or more of detected objects, subjects, colors, environments, geolocations, and/or other considerations.

Ranking tasks may correspond to an iterative process in which a user may first select one or more examples of positive (highly-ranked) or negative (low-ranking) multimedia items. The task component 110 may be configured to update a task and/or the user interface component 112 may be configured to update a user interface by re-sorting the multimedia items according to a function that takes into account multimedia item semantic representations 321 determined during pre-processing.

Dynamic sorting may correspond to a collection of items that may be displayed in sorted order (e.g., as computed by the sorting component 340 of the task component 110 in FIG. 3). By way of non-limiting example, the sorting component 340 (FIG. 3) may be configured to facilitate updating a user interface (e.g., via the user interface component 112) dynamically in response to previous user responses 222. By way of non-limiting example, a first ordering may be a function of predicted metadata 311 confidence computed during pre-processing, and/or a second ordering may further incorporate a similarity function to boost (e.g., sorted with higher priority in the order) items similar to those just labeled by a user and/or demote (e.g., sorted with a lower priority in the order) items dissimilar to those just labeled by a user. In some implementations, multimedia items may be updated to be higher in the order based on output of a classifier that uses online learning to update its learned discriminative function in response to previous user responses 222.

Figure 4:
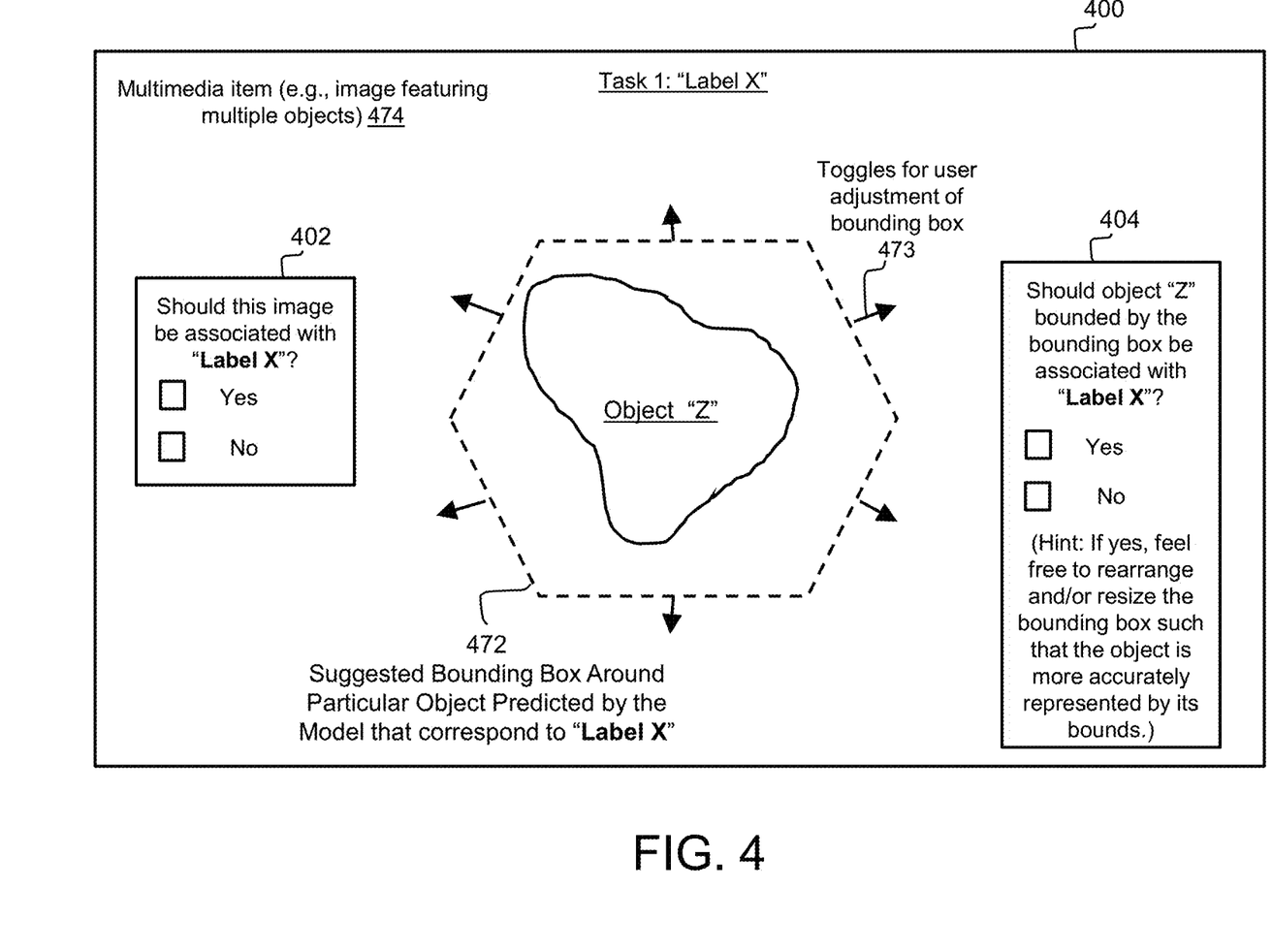
FIG. 4 illustrates an exemplary user interface configured to allow a user to carry out one or more labeling tasks, in accordance with one or more implementations.

FIG. 4 illustrates an exemplary user interface 400 configured to allow a user to carry out one or more labeling tasks, in accordance with one or more implementations. By way of non-limiting example, the user interface 400 may present a first task 402 allowing the user to confirm and/or remove an association of a predicted label (e.g., shown as "Label X" for illustrative purposes) with a multimedia item 474 (e.g., an image featuring multiple objects, and/or other considerations), and/or provide other input. The user interface 400 may display a second task 404 allowing the user to confirm or provide other input regarding whether an object (e.g., object "Z") that is detected (e.g., via a bounding box 472) within the multimedia item 474 should be associated with the predicted label (e.g., Label X). The bounding box 472 may be adjustable via one or more toggles 473 and/or other user interface elements. By way of non-limiting example, the user may resize, move, and/or otherwise arrange the bounding box 472 such that an object or other content of the multimedia item 474 may be appropriately bound by the bounding box 472 to signify association with the current label (e.g., Label X). User input may be provided by "drag and drop" input, selection/deselection of check boxes, and/or other input techniques.

Figure 6:
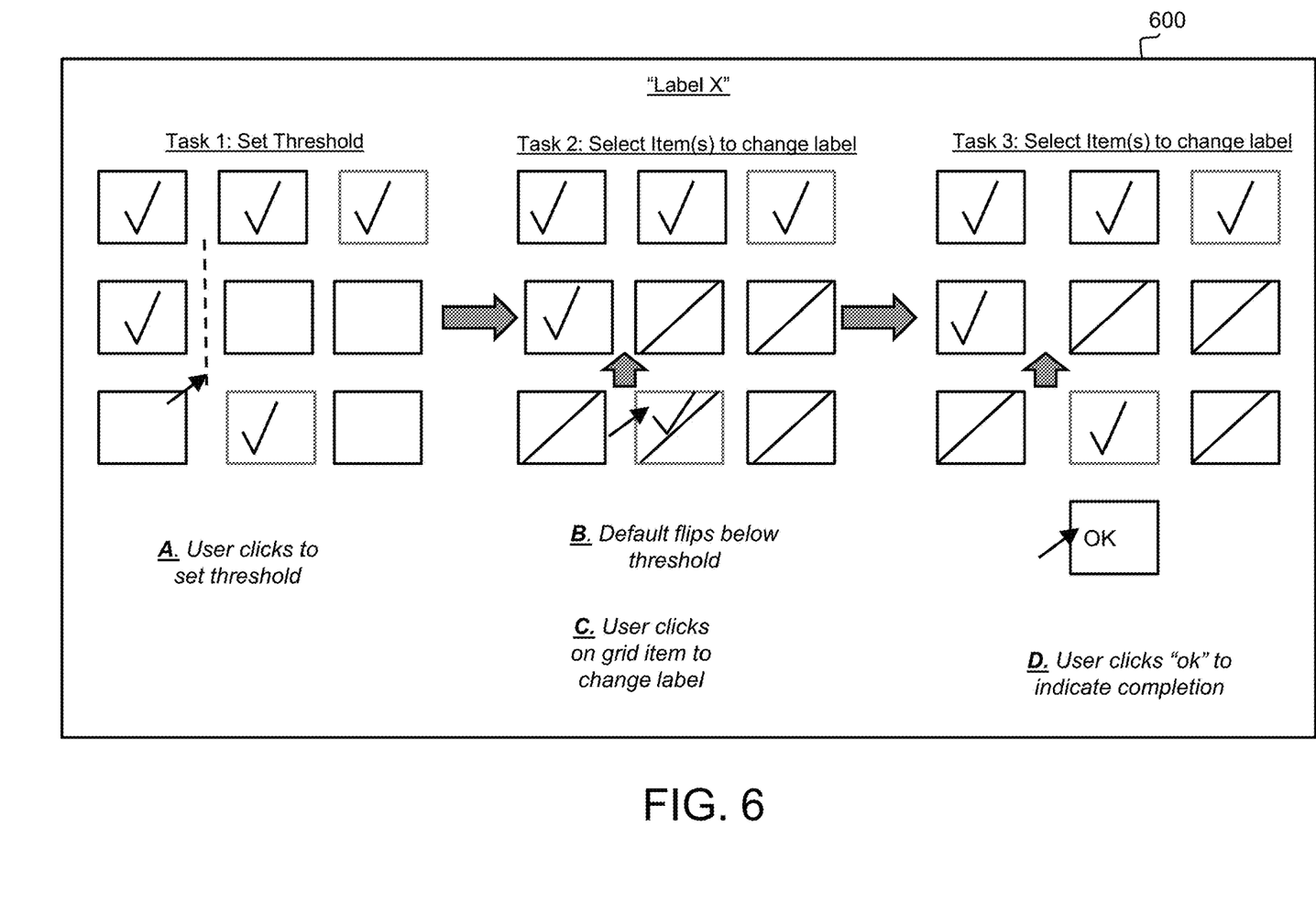
FIG. 6 illustrates an exemplary user interface configured to allow a user to carry out one or more labeling tasks, in accordance with one or more implementations.

FIG. 6 illustrates an exemplary user interface 600 configured to allow a user to carry out one or more labeling tasks 221, in accordance with one or more implementations. In some implementations, the user may be presented with an array of multimedia items and/or representations of multimedia items in accordance with associating one or more of the items with a given label (e.g., Label X). In some implementations, some of the items shown in the grid may be relevant to a current task label (Label X) and/or some may not. Relevant images may be represented by some visual indicator (e.g., a tick mark, a check mark, a visual highlight, and/or other considerations). For clarity, the actions carried out by a user preforming one or more tasks 221 presented in the user interface 600 are described by list elements A, B, C, and D shown in the user interface 600 under each of the presented tasks 221 (e.g., labeled "Task 1," "Task 2," and "Task 3").

In some implementations, in a first task (e.g., labeled "Task 1") the user may provide entry and/or selection (e.g., via a cursor, and/or other input mechanism) of a space between two images and/or sets of images to indicate where to place a threshold (e.g., depicted by the dashed vertical line). The user interface 600 may update (shown in the grid of images under "Task 2") to flip the default below the user-set threshold to a negative label (shown by some visual indicator, such as a strike through the item, and/or other considerations). There may be one or more remaining items incorrectly labeled. In some implementations, under "Task 2," the user may select one or more items to change its label. This may result in a change in the visual indicator of the item (e.g., change from a strike through the item to a check mark on the item, and/or other considerations). In "Task 3," the user may finalize their actions via entry and/or selection of "OK" to indicate completion, and/or other considerations.

In some implementations, an array of rendered multimedia items may be arranged as a list, grid, stack, objects arranged in 3-D space, and/or other considerations for displaying a collection of items.

In some implementations, multimedia items may be rendered in a user interface at sufficient size so content associated with the multimedia items may be distinguished, but small enough so the user can view multiple items simultaneously.

Multimedia content with a time dimension (e.g., audio and/or video content) may be converted to a visual representation that may translate time into a visual dimension, while preserving the property that similar items appear visually similar. By way of non-limiting example, a visual representation of a time series of predicted labels may include a spectrogram-like visualization, and/or other considerations. By way of non-limiting example, or video multimedia items, a movie-strip-like visualization using automatic scene segmentation and/or selection of key frames may provide a visual representation of the video.

Returning to FIG. 1, the learning component 114 may be configured to generate a new machine learning prediction model and/or update an existing machine learning prediction model based on the user input corresponding to labeling responses. By way of non-limiting example in FIG. 3, once a task has reached consensus as determined by the consensus component 370, the responses 222 may be obtained by the learning component 114. The responses 222 may be used to train a new prediction model, to improve and/or update an existing prediction model, and/or other considerations. In some implementations, one or more operations of the learning component 114 may be carried out in an online fashion as tasks 221 reach consensus and/or in an offline fashion once a certain number of tasks 221 have completed and/or would consider all the responses 222. This training (and/or retraining) process may additionally incorporate other metadata and/or information outside the task responses 222. By way of non-limiting example, information may be gathered from external resources (e.g., a third party webpage, and/or other resource). Data from external resources may be combined with the labels gathered from the labeling tasks 221. Aside from improving the prediction of metadata, the training (and/or retraining) processed using responses 222 by the learning component 114 may be used to improve the similarity measures of the semantic similarity component 320 used by a trained prediction models.

In some implementations, once training (and/or retraining) has reached a useful state, a machine learning prediction model may be used to generate new metadata predictions 311 through the metadata prediction component 310 during a post processing procedure (e.g., carried out by the preprocessing component 108, and/or other components). The process may continue to produce new task responses 222 by users during labeling tasks 221 which may be used for training new models and/or retraining existing models. This process may repeat many times over until there is a global consensus on all metadata, a given prediction accuracy target has been reached, and/or a system provider chooses to stop the process.

In FIG. 1, the server 102, user device(s) 104, repository 107, and/or external resources 105 may be operatively linked via one or more electronic communication links. For example, such electronic communication links may be established, at least in part, via a communication network 106 such as the Internet and/or other networks. It will be appreciated that this is not intended to be limiting, and that the scope of this disclosure includes implementations in which server 102, user device(s) 104, repository 107, and/or external resources 105 may be operatively linked via some other communication media.

The external resources 105 may include sources of information, hosts and/or providers of information outside of system 100, external entities participating with system 100, and/or other resources. In some implementations, some or all of the functionality attributed herein to external resources 105 may be provided by resources included in system 100 (e.g., in server 102).

The server 102 may include electronic storage 116, one or more processors 118, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102.

Electronic storage 116 may comprise electronic storage media that electronically stores information. The electronic storage media of electronic storage 116 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store software algorithms, information determined by processor 118, information received from server 102, and/or other information that enables server 102 to function as described herein.

Processor(s) 118 is configured to provide information processing capabilities in server 102. As such, processor 118 may include one or more of a digital processor, an analog processor, a digital circuit designed to process information, an analog circuit designed to process information, a state machine, and/or other mechanisms for electronically processing information. Although processor 118 is shown in FIG. 1 as a single entity, this is for illustrative purposes only. In some implementations, processor 118 may include one or more components. These components may be physically located within the same device, or processor 118 may represent processing functionality of a plurality of devices operating in coordination. The processor 118 may be configured to execute components 108, 110, 112, and/or 114. Processor 118 may be configured to execute components 108, 110, 112, and/or 114 by software; hardware; firmware; some combination of software, hardware, and/or firmware; and/or other mechanisms for configuring processing capabilities on processor 118.

It should be appreciated that, although components 108, 110, 112, and/or 114 are illustrated in FIG. 1 as being co-located within a single component, in implementations in which processor 118 includes multiple components, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 106, 108, 110, and/or other components. As another example, processor 118 may be configured to execute one or more additional components that may perform some or all of the functionality attributed below to one of components 108, 110, 112, and/or 114.

Figure 5:
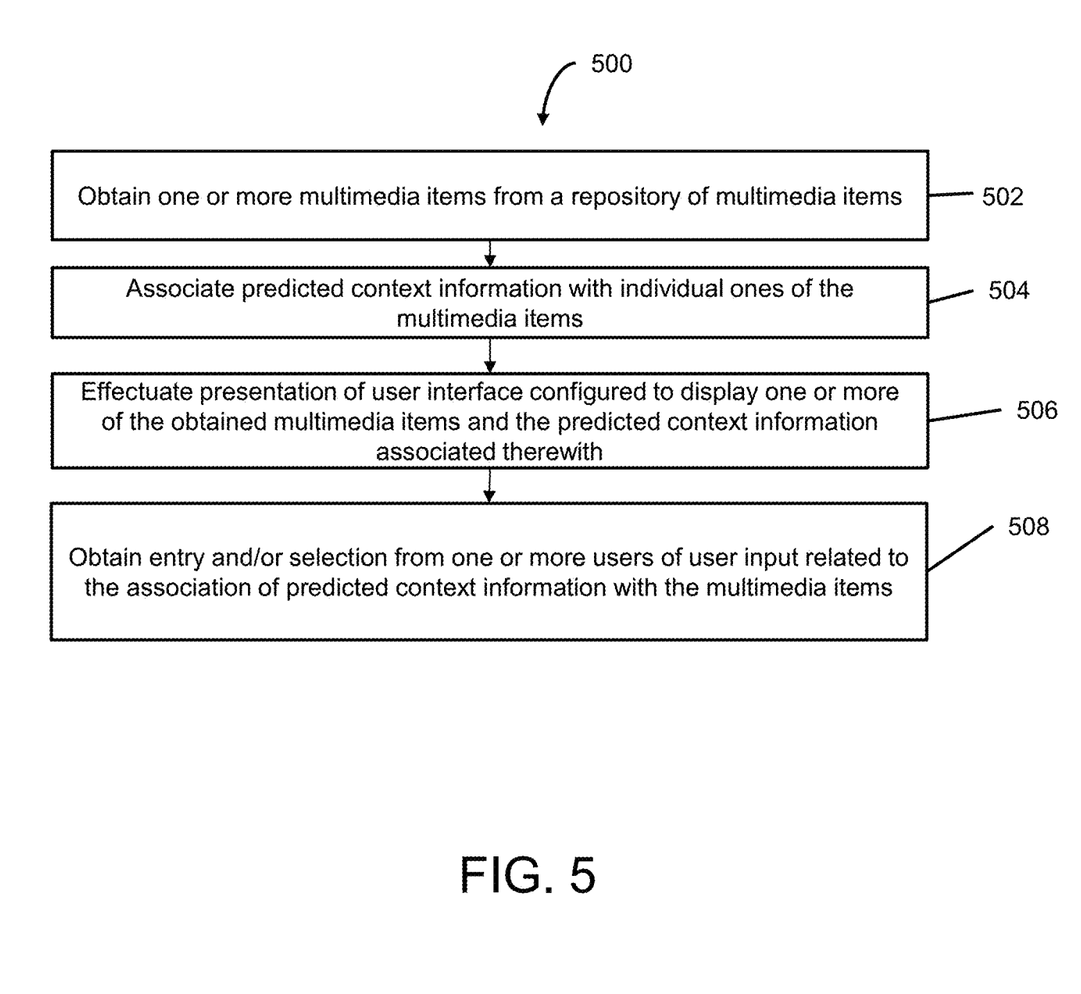
FIG. 5 illustrates a method of associating context information with multimedia items, in accordance with one or more implementations.

FIG. 5 illustrates a method 500 of associating context information with multimedia items, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, a functionally limited processing device, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

Referring now to method 500 in FIG. 5, at an operation 502, one or more multimedia items may be obtained from a repository 107 of multimedia items. In some implementations, operation 502 may be performed by a preprocessing component the same as or similar to preprocessing component 108 (shown in FIG. 1 and described herein).

At an operation 504, predicted context information may be associated with individual ones of the multimedia items. The context information may take the form of a label, a tag, and/or other information associated with the multimedia items. Context information may be stored as metadata associated with the multimedia items. In some implementations, operation 504 may be performed by a preprocessing component the same as or similar to the preprocessing component 108 (shown in FIG. 1 and described herein).

At an operation 506, user interfaces may be presented to users on associated user devices. The user interfaces may be configured to display one or more of the obtained multimedia items and/or the corresponding predicted context information for the multimedia items. The user interface may facilitate users carrying one or more labeling tasks 221, and/or other operations. In some implementations, operation 506 may be performed by a user interface component the same as or similar to the user interface component 112 (shown in FIG. 1 and described herein).

At an operation 508, entry and/or selection of user input may be obtained from the users. Entry and/or selection of user input may be accomplished via interaction elements of the user interfaces. The user input may be related to the association of the predicted context information with the multimedia items display in the user interfaces. By way of non-limiting example, the users may provide input related to adding context information associations, removing predicted context information associations, changing predicting context information associations, confirming predicted context information association, and/or other input. In some implementations, operation 508 may be performed by a user interface component the same as or similar to the user interface component 112 (shown in FIG. 1 and described herein).

Although the present technology has been described in detail for the purpose of illustration based on what is currently considered to be the most practical and preferred implementation, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system comprising:
a computer system comprising one or more processors programmed with computer program instructions that, when executed, cause the computer system to perform operations comprising:
determining a set of multimedia items based on multimedia items of the set of multimedia items being associated with a label predicted by an instance of a neural network to be a corresponding label for the multimedia items, the multimedia items comprising first and second multimedia items;
obtaining bounding region information for the multimedia items, wherein the bounding region information indicates bounding regions of the multimedia items, each region of the bounding regions being associated with the predicted label;
causing, based on the indicated bounding regions and the association of the predicted label with the multimedia items, graphical representations of the multimedia items to be presented together on a user interface at a same time, the graphical representations comprising a first graphical representation of the first multimedia item and a second graphical representation of the second multimedia item;
obtaining, via the user interface, a user indication for the set of multimedia items together, the user indication being related to the predicted label or a new label for the bounding regions; and
providing, to the neural network, the user indication to cause the neural network to be updated based on the user indication.

2. The system of claim 1, the operations further comprising:
providing, to one or more other neural networks, the user indication to cause the one or more other neural networks to be updated based on the user indication.

3. The system of claim 1, wherein the presentation of the graphical representations comprises superimposing graphical polygons representing the bounding regions on the graphical representations of the multimedia items on the user interface at the same time.

4. The system of claim 1, the operations further comprising:
obtaining, via the user interface, a user adjustment of a bounding region of a multimedia item of the set of multimedia items, wherein the user adjustment comprises a resizing or movement of the bounding region of the multimedia item; and
providing, to the neural network, a result of the user adjustment to cause the neural network to be updated based on the result of the user adjustment.

5. The system of claim 1, wherein the user indication comprises the new label for the bounding regions.

6. A method comprising:
determining a set of multimedia items based on multimedia items of the set of multimedia items being associated with a label predicted by an instance of a prediction model to be a corresponding label for the multimedia items;
obtaining bounding region information for the multimedia items, wherein the bounding region information indicates bounding regions of the multimedia items, each region of the bounding regions being associated with the predicted label;
causing, based on the indicated bounding regions, graphical representations of the multimedia items to be presented on a user interface at a same time;
obtaining, via the user interface, a user indication for the set of multimedia items, the user indication being related to the predicted label or a new label for the bounding regions; and
providing, to the prediction model, the user indication to cause the prediction model to be updated based on the user indication.

7. The method of claim 6, further comprising:
providing, to one or more other prediction models, the user indication to cause the one or more other prediction models to be updated based on the user indication.

8. The method of claim 6, wherein the presentation of the graphical representations comprises superimposing graphical polygons representing the bounding regions on the graphical representations of the multimedia items on the user interface at the same time.

9. The method of claim 6, further comprising:
obtaining, via the user interface, a user adjustment of a bounding region of a multimedia item of the set of multimedia items, wherein the user adjustment comprises a resizing or movement of the bounding region of the multimedia item; and
providing, to the prediction model, a result of the user adjustment to cause the prediction model to be updated based on the result of the user adjustment.

10. The method of claim 6, wherein the user indication comprises the new label for the bounding regions.

11. The method of claim 6, wherein the prediction model comprises a neural network.

12. One or more non-transitory computer-readable media comprising instructions that, when executed by one or more processors, cause operations comprising:
determining a set of multimedia items based on multimedia items of the set of multimedia items being associated with a label predicted by an instance of a prediction model to be a corresponding label for the multimedia items;
obtaining bounding region information for the multimedia items, wherein the bounding region information indicates bounding regions of the multimedia items, each region of the bounding regions being associated with the predicted label;
causing, based on the indicated bounding regions, graphical representations of the multimedia items to be presented on a user interface at a same time;
obtaining, via the user interface, a user indication for the set of multimedia items, the user indication being related to the predicted label or a new label for the bounding regions; and
updating the prediction model based on the user indication.

13. The media of claim 12, the operations further comprising:
providing, to one or more other prediction models, the user indication to cause the one or more other prediction models to be updated based on the user indication.

14. The media of claim 12, wherein the presentation of the graphical representations comprises superimposing graphical polygons representing the bounding regions on the graphical representations of the multimedia items on the user interface at the same time.

15. The media of claim 12, the operations further comprising:
- obtaining, via the user interface, a user adjustment of a bounding region of a multimedia item of the set of multimedia items, wherein the user adjustment comprises a resizing or movement of the bounding region of the multimedia item; and
- providing, to the prediction model, a result of the user adjustment to cause the prediction model to be updated based on the result of the user adjustment.

16. The media of claim 12, wherein the user indication comprises the new label for the bounding regions.

17. The media of claim 12, wherein the user indication indicates the set of multimedia items as being relevant to the predicted label.

18. The media of claim 12, wherein the user indication indicates the set of multimedia items as not being relevant to the predicted label.

19. The media of claim 12, wherein each of the multimedia items comprises at least one of an image, an audio, or a video, and the prediction model comprises a machine learning model.

20. The media of claim 12, wherein the prediction model comprises a neural network.

\* \* \* \* \*